(12) United States Patent
Kliene

(10) Patent No.: US 6,261,490 B1
(45) Date of Patent: Jul. 17, 2001

(54) ROTATIONAL MOULDING

(75) Inventor: Ronald Ian Kliene, Pavenham (GB)

(73) Assignee: Rotec Chemicals Limited, Northamptonshire (GB)

( * ) Notice: Subject to any disclaimer, the term of this patent is extended or adjusted under 35 U.S.C. 154(b) by 0 days.

(21) Appl. No.: 09/153,425

(22) Filed: Sep. 15, 1998

(51) Int. Cl.$^7$ .............................. B29C 44/04; B29C 44/06
(52) U.S. Cl. ..................... 264/45.7; 264/45.4; 264/54; 264/255
(58) Field of Search ................... 264/45.5, 45.7, 264/255, 54, 45.4

(56) References Cited

U.S. PATENT DOCUMENTS

| | | | |
|---|---|---|---|
| 2,989,783 | * 6/1961 | Slapnik | 264/45.4 |
| 3,457,205 | * 7/1969 | Nonweiler | 264/45.7 |
| 3,814,778 | 6/1974 | Hosoda et al. | |
| 3,962,390 | * 6/1976 | Mori et al. | 264/45.4 |
| 3,976,821 | * 8/1976 | Carrow et al. | 428/474 |
| 4,952,350 | * 8/1990 | Duffy | 264/45.7 |
| 5,366,675 | 11/1994 | Needham | |
| 5,532,282 | 7/1996 | Needham | |
| 5,783,611 | * 7/1998 | Strebel | 264/45.7 |
| 5,830,392 | * 11/1998 | Strebel | 264/45.7 |

FOREIGN PATENT DOCUMENTS

| | | | |
|---|---|---|---|
| 983226 | * 2/1976 | (CA) | |
| 1 321 341 | 6/1973 | (GB) | |
| 51-60254 | * 5/1976 | (JP) | 264/45.7 |
| WO 95/19877 | 7/1995 | (WO) | |
| WO 96/15892 | 5/1996 | (WO) | |
| WO 97/38839 | 10/1997 | (WO) | |

* cited by examiner

*Primary Examiner*—Allan R. Kuhns
(74) *Attorney, Agent, or Firm*—Merchant & Gould P.C.

(57) ABSTRACT

A method of producing a plastics article having solid skin and a foam core by a rotational moulding process, comprises charging a mold with a skin-forming component and substantially simultaneously with a foam core-forming component of bulk density greater than 0.5 g/cc, providing a first heating stage in which the mold is heated to a first temperature and is rotated for a first predetermined time to form a substantially impervious skin within the mold, and providing a second heating stage in which the mold is heated to a higher second temperature and is rotated for a second predetermined time to cause foaming of said foam core-forming component, thereby forming a foam core within said substantially impervious skin.

19 Claims, No Drawings

ROTATIONAL MOULDING

FIELD OF THE INVENTION

This invention relates to rotational moulding and other casting processes. More specifically, but not exclusively, the invention relates to improved methods of producing a lightweight rigid, foamed or cellular thermoplastic article by the process known as rotational moulding, roto-moulding or rotational casting, using one-shot rotational moulding methods.

BACKGROUND OF THE INVENTION

Using known rotational moulding techniques, moulded articles can be produced having a solid or unfoamed "skin" or envelope and a cellular interior, the latter having a density in the region of 0.15 g/cm$^3$. The composite structure is rigid and of lower overall density than many common woods, and can be used for the manufacture of chemically resistant pallets, boxes, containers and similar goods.

Typical examples of plastics materials used in the production of hollow articles having cellular interiors produced by a rotational moulding technique are polyethylene as the wall, envelope or skin material of the article, and polyurethane as the foam. Polyethylene has useful chemical resistance and toughness and polyurethane foam is rigid and provides the desired degree of stiffness.

There is disclosed in CA 983226 (Du Pont) a method of rotational moulding of polyolefin articles having a foamed inner layer and a substantially solid skin. Molded articles are made in a one-step rotational moulding process using a mixture of powdered non-foamable ethylene polymer, which forms the outer skin, together with a foamable ethylene polymer in pellet form, which forms the foamed inner layer.

In the process of the Canadian patent, the particle size difference as between the foamable pellets and the powdered non-foamable polymer enables a separation of these materials to be achieved during the rotational moulding process so that the moulded product has the necessary solid outer envelope and associated foamed lining.

We have conducted tests of the process described in the Canadian patent and these show clearly that in practice only very thin and uneven skins or envelopes are achieved when using the conditions described in the Canadian patent. These very thin skins have occasional thick spots, but the inadequacy of the skin thickness is such that the process is not really practical, and this is maybe the reason why this one-shot process has never been commercially exploited. Further, the foamed material does not completely fill the moulded product and instead only forms a relatively thin lining on the interior surface of the skin, which limits the effectiveness of the material. Furthermore, we have found that if more of the foamable polymer is added in an attempt to fill the mould, the powder and the pellets do not separate properly, resulting in even poorer skin formation.

We have found that in a one-shot rotational moulding process it is not sufficient merely to provide the two main components of the mould charge with differing particle sizes. While such difference in particle size can achieve a degree of separation of the components to enable formation of the impermeable outer envelope and the foamed material within it, in the absence of other contributory factors as defined below, the process as described in the Canadian patent does not achieve an acceptable wall or envelope thickness.

GENERAL DESCRIPTION OF THE INVENTION

To achieve such an acceptable wall or envelope thickness, we have ascertained that it is necessary to provide two distinct temperature stages in the process, for the materials within the mould. First, there needs to be an initial phase in which the in-mould temperature is high enough to melt the powder of the plastics material which forms the skin or envelope, but is not sufficient to melt the large particles or pellets. Then, there needs to be a second phase in which the in-mould temperature is increased to melt and cause foaming of the large particles or pellets of foamable polymer.

A further contributory factor, which assists in achieving good results, is to increase the rate of rotation of the mould during the initial phase to a higher rate than normal (for example to 15 rpm) so that the large particles or pellets do not stay in one position in the mould long enough to adhere to the melting powder. During the second phase, the rate of rotation may be reduced to a more usual rate of, for example, 5 rpm.

When the skin or envelope has formed in the above-described initial phase, the mould temperature can be increased to that needed to cause the pellets or particles of foamable material to melt and expand so as to fill or partially fill the envelope within the mould.

Our experiments have shown that without the initial lower-temperature envelope-formation phase in the moulding operation, an envelope could not be obtained which had a consistent thickness greater than 1 mm. For most applications of rotational moulding, such as the production of pallets, floats, tote boxes, fish bins etc., a minimum envelope thickness of 3 mm is required and thicknesses up to 6mm are usually needed for the more mechanically demanding applications.

By providing a process wherein the initial envelope formation stage is conducted at a lower temperature than the subsequent foaming stage, the embodiments are able to provide a moulded product having a uniform envelope or wall thickness.

Our test work has shown that the temperature required in the initial envelope or skin formation stage is important and should be in the range defined by the melting point of the plastics material which forms the skin or envelope and a temperature of 10° C. above that melting point. For example, in the case of polyethylenes, the melting points are around 120°C. Our test show that if the temperature rises significantly beyond this range, there will be a reduction in skin thickness.

At this lower temperature, the skin or envelope forms typically at a rate of approximately 1 mm of thickness per 10 minutes of moulding time. It appears that for a particular particle size and material, the rate of skin thickness formation cannot be readily increased as it is dependent upon the melting point of the polyethylene and the thermal conductivity thereof.

The temperatures selected in any given case need to take account of the following additional factors in relation to the mechanism of skin formation. Thus, the temperature in the initial envelope-formation phase should be such as to avoid as far as possible the likelihood of the particles of the envelope-forming plastics material melting right through from one side to the other on contacting the hot mould surface, and thereby forming sites at which the larger particles of the foamable second plastics material can adhere thereto and thus be trapped in or on the envelope or skin so that when the subsequent higher temperature foam-forming phase commences, there is produced a blowhole in the envelope of the moulded article, which will render it commercially unacceptable.

Our test work has shown that although the difference in particle size between the skin-forming component and the foam core-forming component is not sufficient on its own to ensure good separation of the two components and therefore good skin formation, it is important. We have found that for the skin-forming component a ground non-foamable polymer powder of maximum particle size 500 to 600 microns is suitable, whereas for the foam core-forming component foamable polymer granules having maximum dimensions in the range 3mm to 5mm are most suitable.

By employing comparatively large granules, preferably pellets, of the foam-producing material the result is achieved that these pellets are able, by virtue of their comparatively large size, to roll around within the hollow interior of the partly-moulded article, and indeed to pass through relatively narrow restrictions inherent in the shape thereof, so as to achieve a substantially uniform distribution. This uniform distribution is due, not least, to the fact that the larger particle size has the result that a slower melting and slower corresponding increase in tackiness of the particles or pellets is produced, whereby a lower tendency of these to bridge or otherwise block portions of the internal surface of the moulded article results.

The larger pellets also take longer to warm up than the grains of the powdered skin-forming component and so do not melt as quickly. They therefore remain solid while the skin is forming and do not undergo any significant expansion during that time. This helps to maintain good separation of the two components and results in good skin formation.

Our work shows that the bulk density of the foamable material is very important in this one-shot process and the particles used should not have undergone any significant preliminary foaming or expansion since there is a critical bulk density (BD) for the foamable material below which it will not adequately separate from the other plastics material during the moulding process. This BD is around 0.5 gm/cc. The higher this BD figure is, the better will be the separation from the envelope-forming powder, which has a bulk density of approximately 0.3 gm/cc. In embodiments of the invention the difference between the BDs of the two plastics materials used in the one-shot process is kept as large as possible.

Maintaining a bulk density of at least 0.5 g/cc is also important in order to ensure that the moulded product is fully filled with foam. If the bulk density falls below that level, the mould may not contain enough foamable material to completely fill it, even if the mould is charged with enough pellets to fill it completely when cold.

A simple method of control testing is to measure the bulk density of a sample of pellets by pouring them into a one litre measuring cylinder and weighing the whole sample that occupies this volume. Any pellets that do not have the required bulk density of at least 0.5 g/cc are rejected and not used in the moulding process.

Another important feature relates to the melt flow index (MFI) and the polymer density (as opposed to bulk density) of the two components, careful selection of these properties being essential to ensure good separation. There is relationship between the density of a polymer material and its crystalline melting temperature, a high density being associated with a high melting temperature. The MFI gives an indication of the viscosity of the polymer in a molten state, a high MFI indicating a polymer of low viscosity that flows easily when molten.

We have found that for optimum results, the skin-forming component should have a low MFI and a low density, whereas the foam core-forming component should have a higher MFI and a high density. The skin-forming powder will then melt quickly during the initial low temperature stage but will remain relatively non-sticky and will stick to the metal mould but not to the foamable pellets, which therefore remain mobile within the mould. The foamable pellets on the other hand have a high melting temperature, ensuring that they do not melt during the initial low temperature heating stage, but will flow easily when melted (during the subsequent high temperature heating stage), ensuring that the moulded product is properly filled with foam.

A further important feature is that the foam core-forming component should produce a high-rise foam, to ensure that the space in the envelope is fully filled after heating. We have found that pellets containing greater than 2% wt blowing agent give satisfactory results.

Yet another significant feature concerns the use of additives in the foam core-forming component. We have found for example that the inclusion of an activator such as zinc stearate gives improved results.

SUMMARY OF THE INVENTION

According to the present invention there is provided a method of producing a plastics article having solid skin and a foam core by a rotational moulding process, the method comprising:

charging a mould with a skin-forming component including a first plastics material in the form of a comparatively fine powder and substantially simultaneously with a foam core-forming component including a second plastics material and a blowing agent in the form of comparatively large pellets, providing a first heating stage in which the mould is heated to a first temperature and is rotated for a first predetermined time to form a substantially impervious skin within the mould, providing a second heating stage in which the mould is heated to a higher second temperature and is rotated for a second predetermined time to cause foaming of said foam core-forming component, thereby forming a foam core within said substantially impervious skin.

Advantageously, said first temperature is equal to the melting temperature of the first plastics material plus 0–10° C. For example, in the case where the first plastics material is polyethylene having a melting temperature of 130° C., said first temperature is advantageously, in the range 130–140° C.

Advantageously, said second temperature is in the range 200–350° C. and is preferably approximately 280° C.

Advantageously, during the first heating stage the mould is rotated at a speed of greater than 10 rpm, preferably approximately 15rpm.

Advantageously, the bulk density of the foam core-forming component is at least 0.50 g/cc, preferably approximately 0.52 g/cc.

Advantageously, the foam core-forming component contains greater than 2% wt blowing agent, for example azodicarbonamide, to produce a high-rise foam.

Advantageously, the foam core-forming component contains an activator, for example zinc stearate.

Advantageously, the second plastics material is polyethylene.

Advantageously, the melt flow index of the second plastics material is no greater than 10 and is preferably in the range 3.0–6.0.

Advantageously, the polymer density of the second plastics material is in the range 0.935–0.960 g/cc.

Advantageously, the pellet size of the foam core-forming component is in the range 2.5–5.0 mm, preferably approximately 3.0 mm. The pellets are preferably substantially uniform in shape (ideally spherical), with no significant elongation.

Advantageously, the first plastics material is polyethylene.

Advantageously, the melt flow index of the first plastics material is no greater than 3.5 and is preferably in the range 1.5–2.5.

Advantageously, the polymer density of the first plastics material is in the range 0.910–0.935 g/cc.

Advantageously, the maximum particle size of the skin-forming component is in the range 150–850 μm, preferably 150–600 μm, more preferably approximately 500 μm.

Advantageously, the bulk density of the skin-forming component is less than 0.40 g/cc, preferably approximately 0.30 g/cc.

DETAILED DESCRIPTION OF THE INVENTION

In the following non-limiting examples, plastics material 1 is the skin-forming component comprising powdered polyethylene, and plastics material 2 is the foam core-forming component comprising compounded pellets of polyethylene and a blowing agent, for example azodicarbonamide. The pellets may also contain additives such as antioxidants, stabilizers and pigments, and an activator such as zinc stearate.

EXAMPLE 1

"ONE-SHOT" PROCESS

A rotationally moulded polyolefin article having a foamed interior and a substantially solid skin was produced in a "one-shot" system as follows:

Mold Block 300 mm×450 mm×45 mm

Process

Two polyethylene materials, one powder the other pellets, were poured into the open mould without prior blending. The mould was closed and heated with appropriate rotation. After heating for a suitable time the mould was removed from the oven for cooling.

MATERIALS

| Polyethylene | Particle size | Resin Density (g/cc) | BD (g/cc) | MFI (@ 190° C.) | Charge weight (g) |
|---|---|---|---|---|---|
| 1. Powder | 500μ | 0.935 | 0.30 | 2 | 1250 |
| 2. Pellets | 3 mm | 0.950 | 0.52 | 4 | 750 |

PROCESS CONDITIONS

| | Temperature (° C.) | Time (mins) | Rotation Speed (RPM) |
|---|---|---|---|
| First Heat Stage | 140 | 34 | 15 |
| Second Heat Stage | 280 | 6 | 5 |
| Cooling | | 40 | 5 |

PRODUCT

The properties of the resultant product were:-
Average skin thickness    4 mm
Cellular foam density     0.15 g/cc

EXAMPLE 2

"ONE-SHOT" PROCESS

A rotationally moulded polyolefin article having a foamed interior and a substantially solid skin was produced in a "one-shot" system as follows:

Mold Block 300 mm×450mm×45mm

Process

Two polyethylene materials, one powder the other pellets, were poured into the open mould without prior blending. The mould was closed and heated with appropriate rotation. After heating for a suitable time the mould was removed from the oven for cooling.

MATERIALS

| Polyethylene | Particle size | Resin Density (g/cc) | BD (g/cc) | MFI (@ 190° C.) | Charge weight (g) |
|---|---|---|---|---|---|
| 1. Powder | 500μ | 0.921 | 0.30 | 1.5 | 1250 |
| 2. Pellets | 3 mm | 0.950 | 0.52 | 4 | 1000 |

PROCESS CONDITIONS

| | Temperature (° C.) | Time (mins) | Rotation Speed (RPM) |
|---|---|---|---|
| First Heat Stage | 130 | 34 | 15 |
| Second Heat Stage | 280 | 10 | 5 |
| Cooling | | 44 | 5 |

PRODUCT

The properties of the resultant product were:-
Average skin thickness    4 mm
Cellular foam density     0.20 g/cc In further embodiments of the invention, not detailed above, examples were tested in which the particle size of the envelope or skin-forming first plastics material was modified from the 500 microns employed in the above examples to 800 and 1200 microns for use in a single-shot process in accordance with Examples 1 and 2 above.

Contrary to the expectation that an increase in particle size of the envelope-forming plastics material would tend to inhibit effective separation of it from the foamable core-forming plastics material, on the contrary we have found that good results are obtained in relation to the depth and rate of thickness formation of the envelope or skin.

It is thought that these enhanced performance characteristics can be attributed to the increased particle size of the envelope-forming plastics material enabling a more rapid build-up of envelope or skin thickness, coupled with a greater resistance to any tendency to melt-through from one side to the other of the particles on contacting the hot mould, thereby inhibiting any capture tendency of the particles in relation to entrapment of particles of the blowable material. However, because of a greater tendency of the larger particles to entrap air near the mould surface, the quality of the skin is somewhat impaired.

With the successful use of larger particles of powder it was apparent that the skin forming material itself could be in a pellet form provided the pellets were small enough to separate from the larger pellets. Micro pellets (not greater than 0.5mm in diameter) made by a die face cutter system were used instead of powder. The examples made suffered from a degree of entrapped air in the skin but otherwise functioned as expected.

In the embodiments, where pellets of the foamable material are employed, and likewise in relation to comparably sized particles of this material, the usual maximum range of particle or pellet sizes is from 0.5 to 6 mm with a preferred range of 3 to 5 mm, these dimensions referring to the maximum dimension of a pellet or particle.

The effect of variations in the bulk density (BD) of the foamable pellets is illustrated in Example 3. The bulk densities of the powder and the pellets for the two samples illustrated were as follows:

| Sample A | Sample B |
|---|---|
| Powder 0.30 g/cc | Powder 0.30 g/cc |
| Pellets 0.45 g/cc | Pellets 0.52 g/cc |

It can be seen that the bulk density of the pellets containing the blowing agent is a critical factor in the formation of a quality, unblemished skin. In sample A, foamable pellets have been trapped within the skin, forming blemishes. In sample B, good separation has been achieved, resulting in an unblemished skin.

This fact may be explained as follows:

1. At the speeds of rotation employed the high density particles in a blend of powder and pellets will tend to move inwards towards the centre of the mould cavity and lower density particles will move outwards. The polymer density of the resin used in the pellets has only a marginal effect in increasing the inward movement of the pellets. It effects the second decimal place (e.g. 0.92 to 0.96 g/cc) of the density of the pellet.

However the bulk density of the pellets is an important but simple method of judging the effective density of the pellets. Slight expansion of the pellets by the blowing agent, however small, can reduce the density of a pellet by a much greater order of magnitude than by simply using a lower density resin. The density of individual pellets can drop from 0.96 g/cc to as low as 0.3 g/cc, thus making separation from the powder impossible. Individual powder particles can in effect have a greater density than the pellets and thus reverse the direction of movement.

2. If there is slight decomposition of small amounts of the blowing agent, the gas bubbles generated will rise to the surface of the pellet causing surface roughness due to pitting and cratering. This will attract the finer particles of the powder, which, when heated, will melt and cause adhesion to larger particles of powder. Once this process has begun the efficient separation of the powder and pellets is prevented.

The melt flow index is a measure of the viscosity of a molten polymer, usually polyolefines such as polyethylene, when tested by a low shear plastometer known as a Melt Flow Indexer. (ASTM Test Method No. D1238, or ISO 1133). It is common to measure this viscosity at a standard test temperature of 190° C. A low number (such as 3 or less) indicates a high viscosity under this low shear test method. Conversely a high number (such as 4 to 20 or more) indicates a material of lower viscosity Polyethylenes are manufactured by many major suppliers with a wide range of Melt Flow Index and Density from which suitable types can be selected that will have the desired properties for use in this invention. These suppliers' materials will contain the usual process additives such as antioxidants, UV stabilisers and in some cases colour pigments where colouring is desired.

A high viscosity polymer (low MFI number) is less 'sticky' in its molten condition, at any given temperature, than a low viscosity polymer (high MFI number) of similar type. In the process described and illustrated in Example 1 it can be seen that the MFI of the powder component of the blend is 2, which is a high viscosity type polymer with a low 'stickiness factor' when molten, particularly at low melt temperatures.

In Example 2, the polymer used for the powder component is still one with a high viscosity (or low MFI).

However the polymer resin used for the pellets in both cases has a higher MFI. The choice of MFI in this case is determined by another factor. The pellets contain a chemical blowing agent which begins to produce its decomposition gases at temperatures ranging from 160° C. to 200° C. At these temperatures polyethylene resins are fully molten and the higher the temperature the lower will be the melt viscosity. It is important that the viscosity is not too low so that the cells (or gas bubbles) being formed have some melt strength and are not so fluid as to cause the cell walls to collapse as the gas expands thus preventing the formation of a cellular structure. If the viscosity is too high (lower MFI) then the melt stretching of the molten material is reduced and this can have the effect of restricting cell formation with the result that the expansion of the structure is reduced. The choice of an MFI of 4 is a satisfactory compromise. A suitable range would be in the region of 4 to 6 for a blowing agent of the azo-dicarbonamide type used in our Examples 1 and 2. Any tendency for the surface of the pellets to develop undesirable stickiness is countered by the use of a high density type polymer with its inherent higher crystalline melting point.

What is claimed is:

1. A method of producing a plastics article having solid skin and a foam core by a rotational moulding process, the method comprising:

charging a mould with a skin-forming component including a first plastics material in the form of a comparatively fine powder and substantially simultaneously with a foam core-forming component including a second plastics material and a blowing agent in the form of comparatively large pellets, providing a first heating stage in which the mould is heated in an oven to a first controlled temperature that is equal to the melting temperature of the first plastics material plus 0–10° C., said first controlled temperature being sufficient to melt the first plastics material without causing foaming of the second plastics material and the mould is rotated for a first predetermined time to form within the mould a skin, providing a second heating stage in which the oven temperature is increased so that the mould is heated to a higher second controlled temperature that is sufficient to cause foaming of the second plastics material and is rotated for a second predetermined time to cause foaming of said foam core-forming component, thereby forming a foam core within said skin.

2. A method according to claim 1, in which the bulk density of the skin-forming component is less than 0.40 g/cc.

3. A method according to claim 1, in which said first temperature is in the range 130–140° C.

4. A method according to claim 1, in which said second temperature is in the range 200–350° C.

5. A method according to claim 1, in which during the first heating stage the mould is rotated at a speed of greater than 10 rpm.

6. A method according to claim 1, in which the bulk density of the foam core-forming component is at least 0.50 g/cc.

7. A method according to claim 1, in which the foam core-forming component contains greater than 2% wt blowing agent.

8. A method according to claim 1, in which the foam core-forming component contains an activator.

9. A method according to claim 1, in which the second plastics material is polyethylene.

10. A method according to claim 9, in which the melt flow index of the second plastics material is no greater than 10.

11. A method according to claim 9, in which the melt flow index of the second plastics material is in the range 3.0–6.0.

12. A method according to claim 9, in which the polymer density of the second plastics material is in the range 0.935–0.960 g/cc.

13. A method according to claim 1, in which the pellet size of the foam core-forming component is in the range 2.5–5.0 mm.

14. A method according to claim 1, in which the first plastics material is polyethylene.

15. A method according to claim 14, in which the melt flow index of the first plastics material is no greater than 3.5.

16. A method according to claim 14, in which the melt flow index of the first plastics material is in the range 1.5–2.5.

17. A method according to claim 14, in which the polymer density of the first plastics material is in the range 0.910–0.935 g/cc.

18. A method according to claim 1, in which the maximum particle size of the skin-forming component is in the range 150–850 µm.

19. A method according to claim 1, in which the maximum particle size of the skin-forming component is in the range 150–600 µm.

* * * * *